(12) United States Patent
Kresina

(10) Patent No.: US 7,569,779 B2
(45) Date of Patent: Aug. 4, 2009

(54) HIGH CAPACITY AND HIGH RESOLUTION SCALE

(75) Inventor: Roman Kresina, Oxford, CT (US)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 11/867,968

(22) Filed: Oct. 5, 2007

(65) Prior Publication Data
US 2009/0090565 A1 Apr. 9, 2009

(51) Int. Cl.
G01G 1/38 (2006.01)
(52) U.S. Cl. .............................. 177/210 EM; 177/212
(58) Field of Classification Search .......... 177/210 EM, 177/212
See application file for complete search history.

(56) References Cited

U.S. PATENT DOCUMENTS

| | | | |
|---|---|---|---|
| 3,120,754 A * | 2/1964 | Lebow | 73/862.382 |
| 3,791,467 A * | 2/1974 | Swersey et al. | 177/157 |
| 4,039,036 A * | 8/1977 | Baumgartner et al. | 177/212 |
| 4,375,243 A * | 3/1983 | Doll | 177/25.17 |
| 4,554,987 A | 11/1985 | Dillon | |
| 4,632,198 A * | 12/1986 | Uchimura | 177/211 |
| 4,660,667 A * | 4/1987 | Uchimura et al. | 177/164 |
| 4,771,314 A * | 9/1988 | Parker et al. | 399/232 |
| 4,778,016 A * | 10/1988 | Uchimura et al. | 177/164 |
| 5,190,117 A * | 3/1993 | Freeman et al. | 177/244 |
| 5,347,092 A | 9/1994 | Buchs et al. | |
| 5,393,936 A | 2/1995 | Tyhy et al. | |
| 5,850,057 A * | 12/1998 | Veillette | 177/212 |
| 5,998,742 A * | 12/1999 | Liu et al. | 177/210 EM |
| 6,248,987 B1 * | 6/2001 | Feher et al. | 219/687 |
| 6,936,776 B2 | 8/2005 | Germanton | |

* cited by examiner

Primary Examiner—Randy W Gibson
(74) Attorney, Agent, or Firm—Townsend and Townsend and Crew LLP

(57) ABSTRACT

A scale can include a low capacity sensing mechanism operatively coupled to a load, wherein the low capacity sensing mechanism may detect movement of the load. A transfer mechanism can be operatively coupled to the low capacity sensing mechanism, wherein the low capacity sensing mechanism may enable the scale to weigh both relatively heavy loads and relatively light loads to a minor division resolution associated with the low capacity sensing mechanism.

12 Claims, 5 Drawing Sheets

FIG. 5
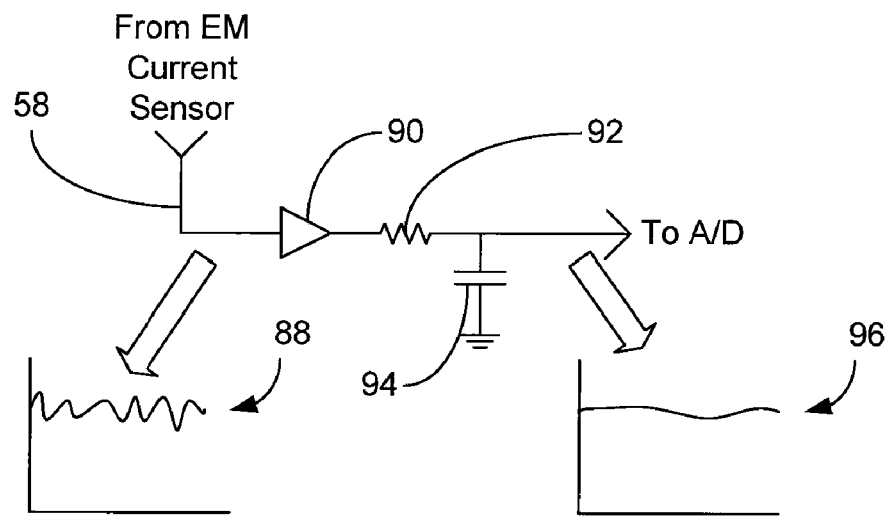
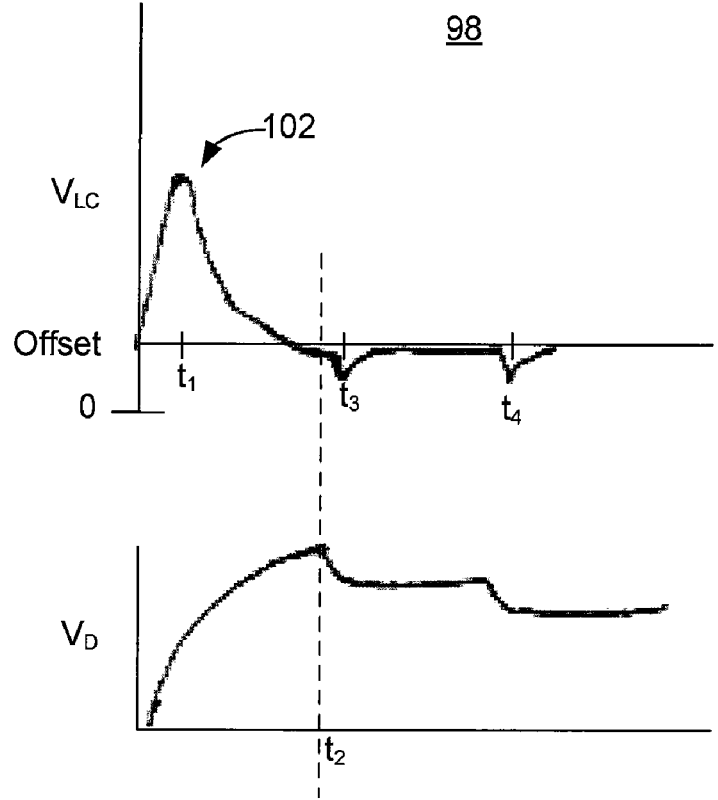
FIG. 6

FIG. 7
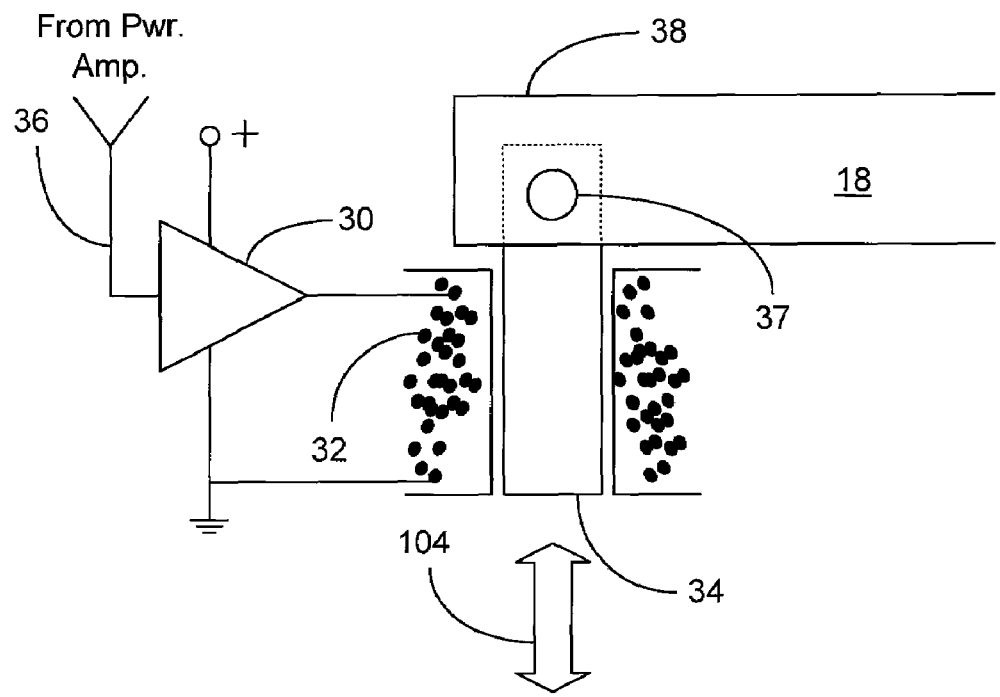
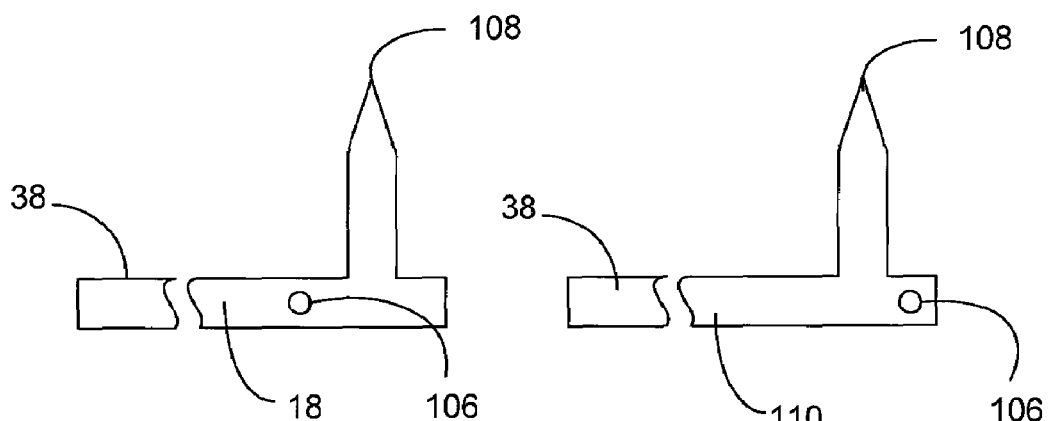
FIG. 8A
FIG. 8B

HIGH CAPACITY AND HIGH RESOLUTION SCALE

BACKGROUND

1. Technical Field

Embodiments of the present invention generally relate to scales. More particularly, embodiments of the present invention relate to scales having the ability to weigh very heavy objects to a high degree of resolution.

2. Discussion

Scales can be used in a wide variety of environments such as automotive, health provider and mail handling environments. For example, modern day postal operations may involve determining package handling and routing procedures, as well as postage, which are all a function of the size and weight of the package. In addition, the size and weight of the packages being processed can vary greatly in a particular setting. Indeed, it may not be uncommon for a given mail handling facility to be required to determine the weight of 0.25 oz letters, as well as 100 lb packages and letter bins. Conventional 0.25 oz scales may not be able to withstand the weight of 100 lb objects, and conventional 100 lb scales may not be able to detect the removal of a single letter from a letter bin containing thousands of letters (or be able to determine the weight of a single letter with an accuracy of ⅟₃₂ oz). Given the significant gap between the weights of the objects and the resolution required for each task, it is not uncommon for different scales having different measurement ranges to be used for these measurements.

BRIEF DESCRIPTION OF THE DRAWINGS

The various advantages of the embodiments of the present invention will become apparent to one skilled in the art by reading the following specification and appended claims, and by referencing the following drawings, in which:

FIG. 5 is a schematic diagram of an example of an analog filter according to an embodiment of the present invention;

FIG. 6 are plots of examples of a load cell voltage curve and a power amplifier drive signal according to an embodiment of the present invention;

FIG. 7 is a diagram of an example of an enlarged view of an electromagnet configuration according to an embodiment of the present invention;

FIG. 8A is a diagram of an example of a measurement end of a lever having a pivot point that is laterally located between a driving end of the lever and a load cell contact point according to an embodiment of the present invention;

FIG. 8B is a diagram of an example of a measurement end of a lever having a load cell contact point that is laterally located between a driving end of the lever and a pivot point of the lever according to an embodiment of the present invention;

DETAILED DESCRIPTION

Figure 1:
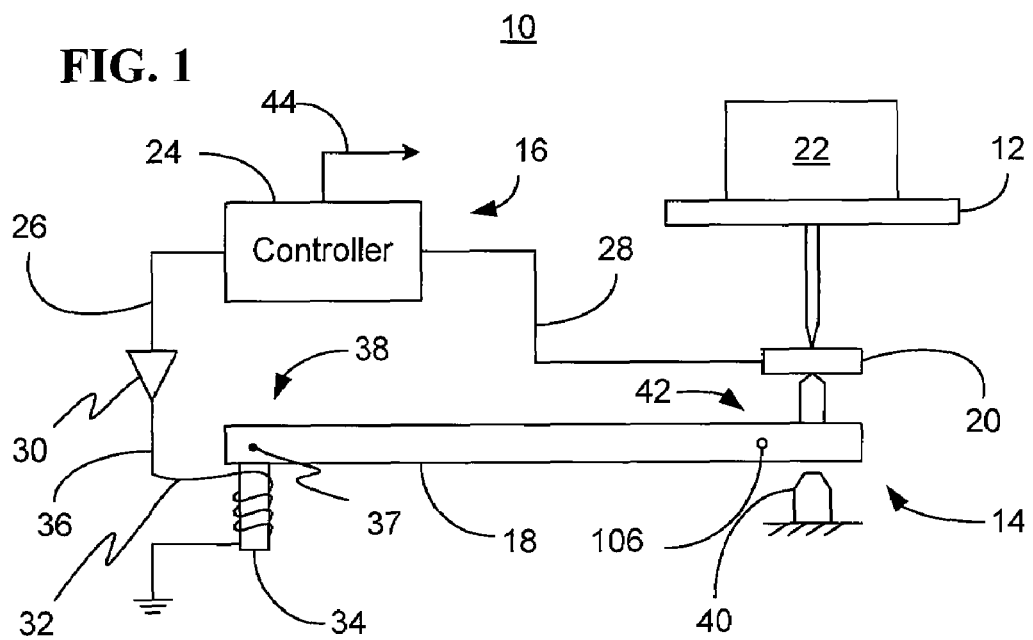
FIG. 1 is a diagram of an example of a scale in which a controller generates weight measurements according to an embodiment of the present invention.

Embodiments of the present invention provide for a scale including a low capacity sensing mechanism operatively coupled to a load, wherein the low capacity sensing mechanism may detect movement of the load. A transfer mechanism can be operatively coupled to the low capacity sensing mechanism, wherein the low capacity sensing mechanism may enable the scale to weigh both relatively heavy loads and relatively light loads to a minor division resolution associated with the low capacity sensing mechanism. The transfer mechanism can include a lever assembly and an electromagnetic actuator.

Embodiments of the present invention also provide for a scale including a support member and a lever assembly. The lever assembly may have a lever positioned below the support member and a low capacity sensing mechanism capable of detecting lever movement associated with a load on the lever, wherein the load results from an object being placed on the support member. The scale may also include an electromagnet actuator operatively coupled to the low capacity sensing mechanism and the lever to neutralize the load on the lever based on the lever movement.

In addition, embodiments of the present invention provide for a postage scale including a support member and a lever assembly having a lever. The lever assembly may also have a load cell disposed between the support member and a measurement end of the lever. The load cell can detect lever movement associated with a load, wherein the load results from an object being placed on the support member. The scale may also include a servo controller that generates a drive signal based on a feedback signal from the load cell, wherein the feedback signal is indicative of the lever movement. The scale can also include a power amplifier to amplify the drive signal from the controller and a coil coupled to the controller to produce an electromagnetic field in response to the amplified drive signal from the power amplifier. A plunger may be coupled to a driving end of the lever, wherein the plunger is responsive to the electromagnetic field. The scale may also include a stop positioned below the measurement end of the lever to limit deformation of the load cell. The scale may therefore have a weight capacity-to-resolution ratio of four or more orders of magnitude.

Other embodiments of the present invention may provide for a method of operating a scale. The method may include receiving a feedback signal from a low capacity sensing mechanism, wherein the feedback signal is indicative of movement of a load corresponding to an object on a support member. The method may also determine whether the low capacity sensing mechanism is outside an operational range based on the feedback signal. A transfer mechanism can be controlled to neutralize the load if the low capacity sensing mechanism is outside the operational range, wherein the transfer mechanism enables the scale to weigh a range of loads to a minor division resolution associated with the low capacity sensing mechanism.

FIG. 1 shows a scale 10 generally having a support member 12, a low capacity sensing mechanism such as a sensor 20, and a transfer mechanism that may include a lever assembly 14 and an electromagnetic actuator 16. The illustrated scale 10 may be used in a wide variety of applications such as postal applications, automotive applications, health care provider applications, etc., and provides a relatively high level of resolution (e.g., minor division resolution of $\frac{1}{32}$ oz) while maintaining the ability to weigh relatively heavy objects (e.g., 100 lbs). In particular, the lever assembly 14 of the transfer mechanism can include a lever 18, wherein the sensor 20 is able to detect lever movement associated with a load on the lever 18. The load may result from an object 22 being placed on the support member 12. The illustrated electromagnetic actuator 16 is operatively coupled to the sensor 20 and the lever 18 to neutralize the load on the lever 18. By using the electromagnetic actuator 16 as a transfer mechanism to neutralize the load resulting from the object 22, the scale 10 may be able to weigh very heavy objects such as vehicles, humans, and large bins of mail. At the same time, by using a high sensitivity sensor 20, the illustrated scale 10 is able to detect the slightest of load changes, such as the addition or removal of a single mailing envelope. Accordingly, the scale 10 may provide greater capacity and resolution over conventional solutions. Indeed, the ratio of the scale's weight capacity to its resolution may be limited only by frictional forces in components such as bearings at pivots 37 and 106.

In particular, the illustrated electromagnetic actuator 16 includes a controller 24, such as a servo controller, that is configured to generate a drive signal 26 based on a feedback signal 28 from the sensor 20, wherein the feedback signal 28 is indicative of the lever movement. In one embodiment, the drive signal 26 and feedback signal 28 are analog signals. The illustrated electromagnetic actuator 16 also includes a power amplifier 30, and a solenoid having a coil 32 and a plunger 34. The power amplifier 30 may amplify the drive signal 26 from the controller 24 and provide the amplified drive signal 36 to the coil 32. The illustrated coil 32 produces an electromagnetic field in response to the amplified drive signal.

The plunger 34 may be coupled to a driving end 38 of the lever 18, wherein the plunger 34 is responsive to the electromagnetic field produced by the current in the coil 32. Accordingly, if weight (e.g., another letter) is added to the support member 12, the increased load on the measurement end 42 of the lever 18 moves the measurement end 42 downward and the sensor 20 may notify the controller 24 of the associated movement. The controller 24 may then increase the current to the coil 32, which forces the driving end 38 of the lever 18 downward and the measurement end 42 of the lever 18 upward to effectively transfer the weight of the additional object to the driving end 38 and neutralize the load. Similarly, if weight is removed from the support member 12, the decreased load on the measurement end 42 of the lever 18 (and preexisting drive signal) moves the measurement end 42 upward and the sensor 20 may notify the controller 24 of the associated movement. In either instance, the illustrated controller 24 is also configured to generate a weight measurement 44.

While the transfer mechanism is compensating for the sensor 20, the weight measurement 44 may be generated 1) upon neutralization of the load, or 2) as the load approaches neutralization. In the first instance, the controller 24 may adjust the drive signal current until the load is approximately zero, and calculate the weight measurement 44 based on the drive signal current required to neutralize the load. This example may be useful in configurations in which the sensor 20 can indicate a zero "steady-state" condition, but may not be able to produce weight measurements. In the second instance, the controller 24 may generate the weight measurement 44 based on the intermediate drive signal current and the feedback signal 28 as the controller 24 makes intermediate drive signal current adjustments. This example may be useful in configurations in which the sensor 20 is a device such as a load cell that is able to produce weight measurements that may be summed with the weight calculated from the drive signal current. In this regard, the sensor 20 may be a load cell such as a strain gauge load cell disposed between the support member 12 and a measurement end 42 of the lever 18. The illustrated scale 10 also includes a stop 40 to limit deformation of the load cell. While other sensors such as optical, linear variable differential transformer (LVDT), micro-electro-mechanical system (MEMS), and piezoelectric sensors may also be used, there are a number of aspects of load cells for which embodiments described herein are well suited. For example, the use of a load cell and intermediate weight calculations may enable faster operation of the scale 10.

Additionally, although the illustrated actuator 16 uses a solenoid to neutralize the load, other technologies such as stepper motor solutions may be used without parting from the spirit and scope of embodiments described herein.

Figure 2:
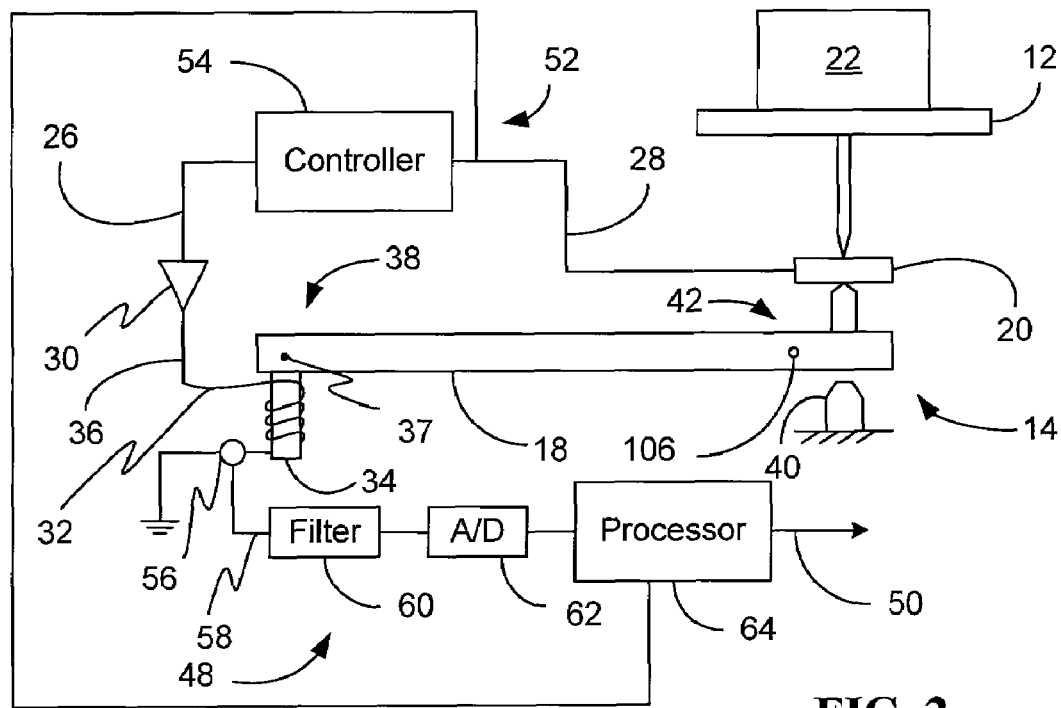
FIG. 2 is a diagram of an example of a scale in which a weight calculation circuit generates weight measurements according to an embodiment of the present invention.

Turning now to FIG. 2, an alternative embodiment of a scale 46 is shown in which a weight calculation circuit 48 is used to generate a weight measurement 50. In particular, the illustrated weight calculation circuit 48 has an interface with an electromagnetic actuator 52, wherein the actuator 52 can include a controller 54, power amplifier 30, coil 32 and plunger 34. The interface may be a current sensor 56 that detects the voltage across a relatively small known resistance that is in series with the coil 32 in order to measure the actuation current flowing through the coil 32. The result may be an analog measurement signal 58 that is proportional to the amount of force required to neutralize the load. The illustrated circuit 48 also includes an analog filter 60 to filter the analog measurement signal 58 and an analog to digital (A/D) converter 62 to convert the filtered measurement signal into a digital measurement signal. A processor 64 may be used to determine the weight of the object 22 based on the digital measurement signal, and generate the weight measurement 50. In particular, the processor 64 may perform a running average to enhance accuracy. The processor 64 may also generate the weight measurement 50 based on the feedback signal 28 to the extent that the sensor 20 is able to produce weight measurements and/or the scale 46 is not in compensation mode, as already discussed.

Figure 3A:
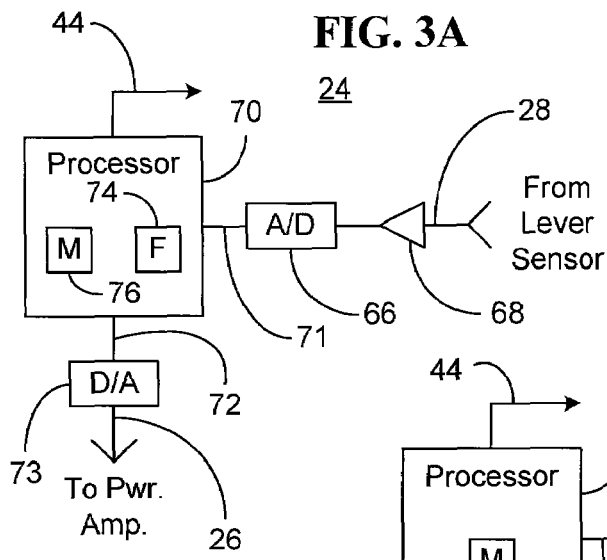
FIG. 3A is a diagram of an example of a controller having digital filtering and measurement functionality according to an embodiment of the present invention.

FIG. 3A shows one example of the controller 24 (FIG. 1) in greater detail. In the illustrated example, the controller 24 includes a pre-amplifier 68 that is configured to amplify the feedback signal 28 from the sensor 20 (FIG. 1) and an A/D converter 66 that converts the amplified feedback signal into a digital feedback signal 71. A processor 70 may determine and generate a digital drive signal 72 based on the digital feedback signal 71, wherein a digital to analog (D/A) converter 73 may be used to convert the digital drive signal 72 into the analog drive signal 26 already discussed. The illustrated processor 70 also includes filtering logic 74 to filter the digital feedback signal 71 and measurement logic 76 to determine the weight of the object 22 (FIG. 1) based on the digital drive signal 72 and/or the digital feedback signal 71. The weight may be indicated in the weight measurement 44.

Figure 3B:
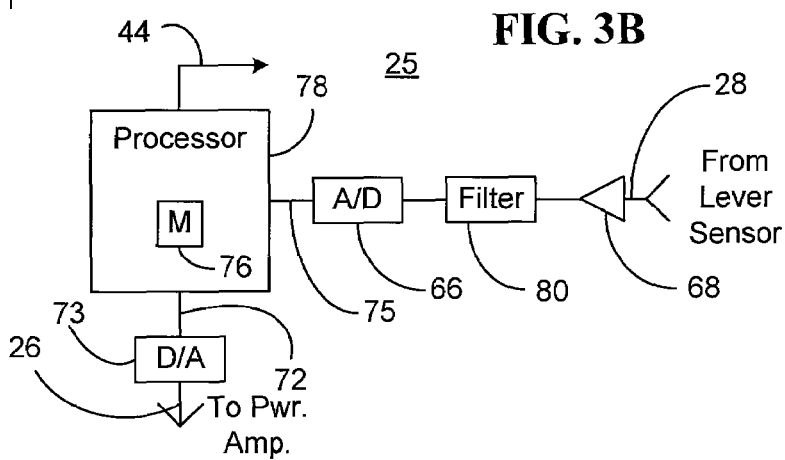
FIG. 3B is a diagram of an example of a controller having digital measurement and analog filtering functionality according to an embodiment of the present invention.

FIG. 3B shows an alternative to the controller 24 (FIG. 3A), wherein a controller 25 includes an analog filter 80 that filters the amplified feedback signal from the pre-amplifier 68 and provides the filtered feedback signal to the A/D converter 66. In this case, a processor 78 may determine and generate the digital drive signal 72 based on a digital feedback signal 75, and use measurement logic 76 to determine the weight of the object 22, but digital filtering logic may be eliminated due to the use of the analog filter 80.

Figure 4A:
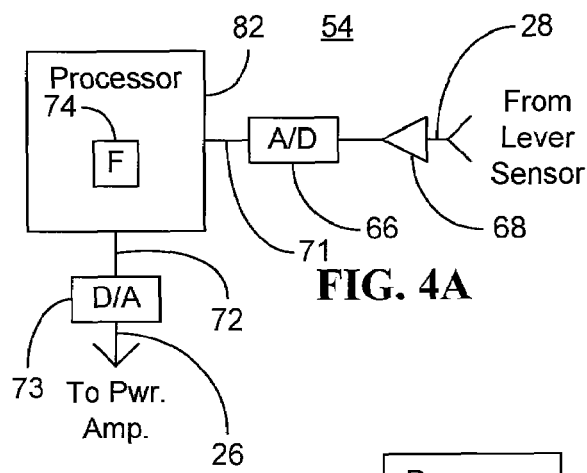
FIG. 4A is a diagram of an example of a controller having digital filtering functionality according to an embodiment of the present invention.
Figure 4B:
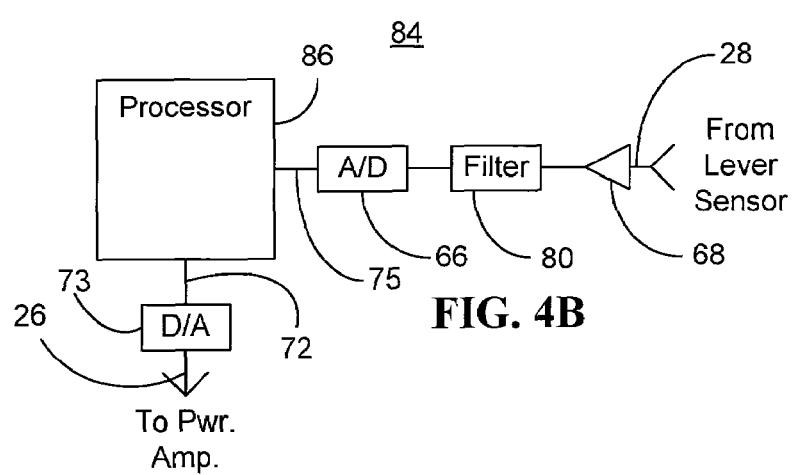
FIG. 4B is a diagram of an example of a controller having analog filtering functionality according to an embodiment of the present invention.

Turning now to FIG. 4A, an example of the controller 54 (FIG. 2) is shown in greater detail. In particular, the controller 54 has a processor 82 that includes filtering logic 74 to filter the digital feedback signal 71, but might not include measurement logic because the weight measurement is made by the weight measurement circuit 48 (FIG. 2). Alternatively, FIG. 4B illustrates a controller 84 in which a processor 86 is used to determine and generate the digital drive signal 72, but not to filter the feedback signal or determine the weight of the object.

FIG. 5 shows one example of a low pass filter 60 that may be used to process signals from the electromagnetic actuator current sensor 56 (FIG. 2). In the illustrated example, analog measurement signal 58 exhibits slight variability due to vibration and/or other factors as shown in input trace 88. An amplifier 90, resistor 92, and capacitor 94 combination, however, may form a low pass filter and yield a filtered measurement signal with less variation as reflected in an output trace 96. Other possible implementations of this and other filtering processes can include transforms such as Laplace transforms.

Turning now to FIG. 6, a load cell voltage plot 98 and a drive signal plot 100 illustrate an example of scale operation as described above. In particular a stack of mail may be placed on the scale 10 (FIG. 1), causing the load cell voltage ($V_{LC}$) to grow to a peak 102 at time $t_1$. During this period, the illustrated drive signal voltage ($V_D$) increases, which can cause the load cell voltage to return toward zero offset after the peak at time $t_1$. When the load cell voltage reaches zero offset, the drive signal voltage can level off ($t_2$). At the illustrated time $t_3$, a letter is removed from the pile, which may cause the drive signal voltage to reduce until the load cell voltage returns to zero offset again, where the drive signal voltage will level off. At the illustrated time $t_4$, another letter is removed from the pile, which may cause the drive signal to reduce again until the load cell voltage returns to zero offset. Again, the drive signal voltage may level off once the load has been neutralized.

FIG. 7 shows a solenoid having a coil 32 and plunger 34 in greater detail, wherein the plunger 34 is coupled to the driving end 38 of the lever 18 and is responsive to the electromagnetic field produced by the current flowing through the coil 32. The plunger 34 may be a high strength magnet plunger having a generally vertical magnetic polarization 104. A small current sensing resistor (not shown) may also be used as an interface between a weight calculation circuit (FIG. 2) and the coil 32. As already noted, other solutions such as stepper motor solutions may also be used.

FIGS. 8A and 8B show various configurations for the lever pivoting mechanism. In particular, FIG. 8A illustrates an example in which the lever 18 has a pivot point 106 that is laterally located between the driving end 38 of the lever 18 and a support member interface point 108, whereas FIG. 8B illustrates an example in which a lever 110 has a support member interface point 108 that is laterally located between the driving end 38 of the lever 110 and the pivot point 106 of the lever 110.

Figure 9A:
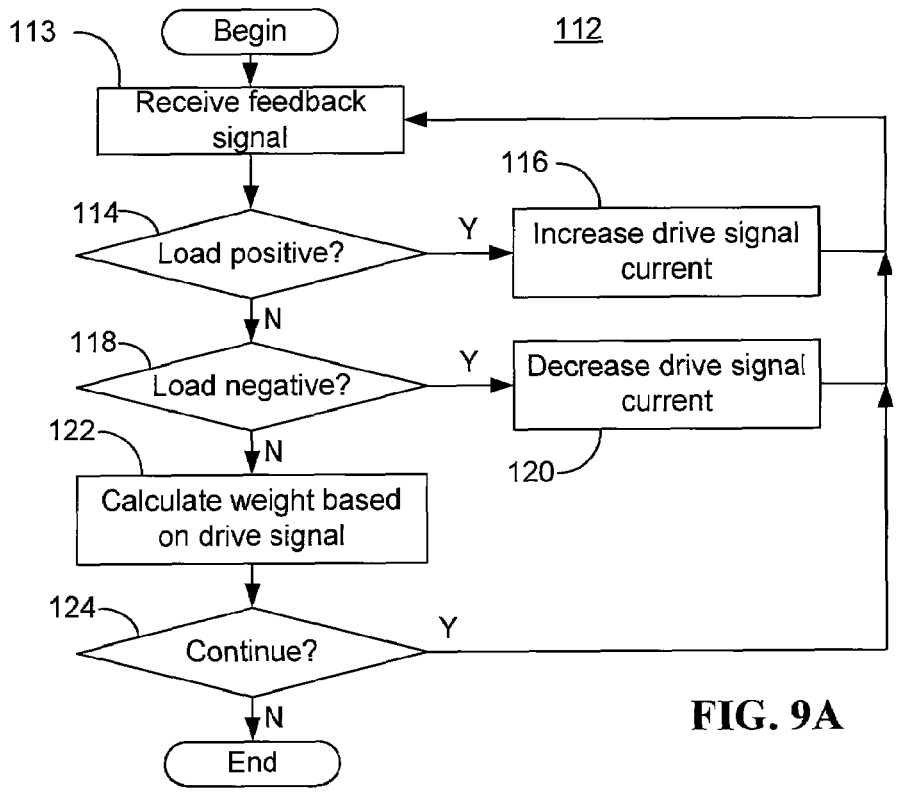
FIG. 9A is a flowchart of an example of a method of weighing an object upon neutralization of a load according to an embodiment of the present invention.
Figure 9B:
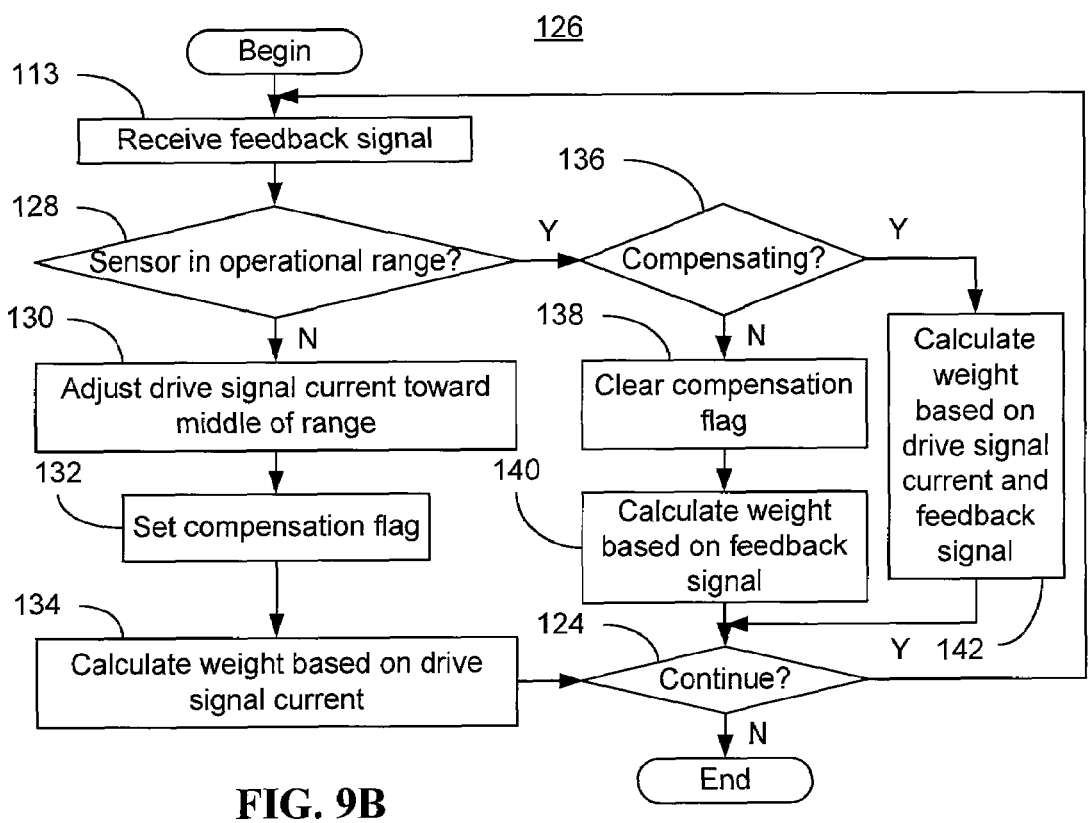
FIG. 9B is a flowchart of an example of a method of weighing an object prior to neutralization of a load according to an embodiment of the present invention.

Turning now to FIGS. 9A and 9B, methods 112 and 126 of operating a scale are shown, respectively. The methods 112 and 126 may be implemented in a controller and/or weight calculation circuit as a set of processor-executable instructions stored in read only memory (ROM), random access memory (RAM), electrically erasable programmable ROM (EEPROM), flash memory, etc., as fixed functionality hardware such as an embedded microcontroller, application specific integrated circuit (ASIC), etc. using complementary metal oxide semiconductor (CMOS) technology or transistor-transistor-logic (TTL), or any combination thereof. In particular, the scale may be operated in response to a feedback signal indicative of a load corresponding to an object on a support member of the scale.

In the illustrated example of FIG. 9A, weight measurements are made based on the amount of force required to neutralize the load. For example, process block 113 provides for receiving the feedback signal and block 114 provides for determining whether the load is positive (e.g., pushing the measurement end of the lever down). If so, the drive signal current/voltage can be increased at block 116. It is understood that depending upon the direction of the electromagnetic field and plunger polarization, the positive/negative and/or increasing/decreasing designations may be reversed without parting from the spirit and scope of the embodiments described. If it is determined that the load is not positive, block 118 provides for determining whether the load is negative. If so, the drive signal current/voltage is decreased at the illustrated block 120. Otherwise, it can be determined that the load has been neutralized and the weight of the object can be calculated at block 122 based on the drive signal. Thus, the illustrated example makes weight calculations based on the drive signal once the load has been neutralized. As already discussed, the weight determination may be based on other factors such as the amount of current sensed in the electromagnetic actuator. Block 124 determines whether to continue taking readings and compensating for load variations.

FIG. 9B shows an alternative method 126 in which weight calculations may be made before the load has been fully neutralized. The illustrated example is particularly useful for applications using a load cell, which may be capable of generating feedback signals that are indicative of weight. In particular, block 113 provides for receiving the feedback signal and block 128 provides for determining whether the low capacity sensing mechanism (e.g., load cell) is within its operational range based on the feedback signal. For example, if the load cell is rated at a maximum load of 5 lbs and the feedback signal indicates a weight of 3½ lbs, it can be determined that the load cell is functioning within the operational range. If, however, the load cell indicates a weight of 5 lbs (or overload/error), it can be determined that the load cell is outside the operational range.

If the load cell is outside its operational range, illustrated block 130 provides for adjusting a drive signal current of a transfer mechanism (e.g., actuator and/or lever assembly) toward the middle of the operational range and illustrated block 132 provides for setting a compensation flag to indicate that the transfer mechanism is in compensation mode. The compensation flag may be a bit stored in memory, wherein the value of the bit indicates whether the transfer mechanism is compensating for the load cell. The weight of the object may be calculated at block 134 based on the drive signal current.

If the load cell is within its operational range, illustrated block 136 provides for determining whether the transfer mechanism is in compensation mode. Thus, the determination at block 136 may be made by checking the aforementioned compensation flag. If the transfer mechanism is not in compensation mode, illustrated block 138 provides for clearing the compensation flag, and illustrated block 140 provides for calculating the weight of the object based on the feedback signal. If the transfer mechanism is in compensation mode, the weight of the object may be calculated at block 142 based on the drive signal current and the feedback signal. In particular, the weight calculated from the drive signal current may be summed with the weight indicated by the feedback signal to obtain an "intermediate" weight while the transfer mechanism works toward neutralizing the load.

Embodiments described herein therefore provide a relatively high level of resolution (e.g., minor division resolution of 1/32 oz) while maintaining the ability to weigh relatively heavy objects (e.g., 100 lbs). For example, such a ratio of weight capacity-to-resolution can be 51,200:1, which represents four orders of magnitude—a substantial improvement over certain conventional approaches. Other advantages, including but not limited to, greater speed, reduced cost and enhanced scale adaptability may also be obtained from the techniques discussed herein.

The terms "connected", "coupled" and "attached" are used herein to refer to any type of relationship, direct or indirect, between the components in question, and may apply to electrical, mechanical, RF, optical or other couplings, unless otherwise indicated. In addition, any uses of the term "first", "second", and so on herein are only to facilitate discussion, and do not necessarily infer any type of temporal or chronological relationship.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specifications, and following claims.

What is claimed is:

1. A scale comprising:
   a low capacity sensing mechanism operatively coupled to a load, the low capacity sensing mechanism to detect movement of the load; and
   a transfer mechanism operatively coupled to the low capacity sensing mechanism, the transfer mechanism to enable the scale to weigh both relatively heavy loads and relatively light loads to a minor division resolution associated with the low capacity sensing mechanism,
   wherein, the transfer mechanism includes:
      a lever assembly having a lever positioned below a support member, wherein the load is to result from an object being placed on the support member and the low capacity sensing mechanism is to detect lever movement associated with the load on the lever; and
      an electromagnetic actuator operatively coupled to the low capacity sensing mechanism and the lever to neutralize the load on the lever in response to the lever movement; and
   the low capacity sensing mechanism is a load cell disposed between the support member and a measurement end of the lever.

2. The scale of claim 1, wherein the relatively light loads correspond to loads on an order of a single mailing envelope and the scale has a weight capacity-to-resolution ratio of at least four orders of magnitude.

3. The scale of claim 1, wherein the electromagnetic actuator includes:
   a controller to generate a drive signal based on a feedback signal from the low capacity sensing mechanism, wherein the feedback signal is indicative of the lever movement;
   a coil coupled to the controller to produce an electromagnetic field in response to the drive signal from the controller; and
   a plunger coupled to a driving end of the lever and responsive to the electromagnetic field.

4. The scale of claim 3, wherein the controller includes:
   a pre-amplifier to amplify the feedback signal from the low capacity sensing mechanism;
   an analog to digital (A/D) converter to convert the amplified feedback signal into a digital feedback signal;
   a processor to determine and generate a digital drive signal based on the digital feedback signal; and
   a digital to analog (D/A) converter to convert the digital drive signal into an analog drive signal.

5. The scale of claim 4, wherein the processor is to further filter the digital feedback signal and determine a weight of the object based on the digital drive signal.

6. The scale of claim 4, wherein the processor is to further determine a weight of the object based on the digital drive signal, the controller further including an analog filter to filter the amplified feedback signal from the pre-amplifier and provide the filtered feedback signal to the A/D converter.

7. The scale of claim 3, further including a power amplifier to amplify the drive signal from the controller and provide the amplified drive signal to the coil.

8. The scale of claim 1, further including a weight calculation circuit having an interface with the electromagnetic actuator to generate an analog measurement signal indicative of an amount of force required to neutralize the load, an analog filter to filter the analog measurement signal, an analog to digital (A/D) converter to convert the filtered measurement signal into a digital measurement signal and a processor to determine a weight of the object based on the digital measurement signal and a feedback signal from the low capacity sensing mechanism.

9. The scale of claim 8, wherein the interface is a current sensor.

10. The scale of claim 1, further including a stop positioned below the measurement end of the lever to limit deformation of the load cell.

11. The scale of claim 1, wherein the lever has a pivot point that is laterally located between a driving end of the lever and a support member interface point of the lever.

12. The scale of claim 1, wherein the lever has a support member interface point that is laterally located between a driving end of the lever and a pivot point of the lever.

* * * * *